(12) United States Patent
Sporer et al.

(10) Patent No.: US 7,096,772 B2
(45) Date of Patent: Aug. 29, 2006

(54) SYSTEM AND METHOD FOR CONTROLLING HYDRAULIC FLUID FLOW

(75) Inventors: Mark Andrew Sporer, Apex, NC (US); Dante Toran Thomas, Garner, NC (US); Michael Steven Freberg, Raleigh, NC (US); Paul Anthony Dvorak, Sanford, NC (US)

(73) Assignee: Caterpillar S.A.R.L., Geneva (CH)

( * ) Notice: Subject to any disclaimer, the term of this patent is extended or adjusted under 35 U.S.C. 154(b) by 42 days.

(21) Appl. No.: 10/928,175

(22) Filed: Aug. 30, 2004

(65) Prior Publication Data

US 2006/0042240 A1    Mar. 2, 2006

(51) Int. Cl.
  *F15B 13/04*    (2006.01)
(52) U.S. Cl. .......................................... 91/419; 60/329
(58) Field of Classification Search .................. 60/329; 91/419; 137/468
  See application file for complete search history.

(56) References Cited

U.S. PATENT DOCUMENTS

| | | | |
|---|---|---|---|
| 3,772,889 A * | 11/1973 | Mason et al. ................. | 60/473 |
| 4,855,913 A | 8/1989 | Brekkestran et al. | |
| 4,967,385 A | 10/1990 | Brekkestran et al. | |
| 5,042,323 A | 8/1991 | Murano et al. | |
| 5,043,892 A | 8/1991 | Brekkestran et al. | |
| 5,053,960 A | 10/1991 | Brekkestran et al. | |
| 5,144,864 A | 9/1992 | Sawasaki et al. | |
| 5,195,035 A | 3/1993 | Asahara et al. | |
| 5,331,995 A * | 7/1994 | Westfall et al. ............. | 137/468 |
| 5,558,597 A | 9/1996 | Oba et al. | |
| 5,564,274 A * | 10/1996 | Denbraber et al. ........... | 60/329 |
| 5,865,702 A | 2/1999 | Yokoyama et al. | |
| 5,890,509 A | 4/1999 | Becker et al. | |
| 5,971,068 A | 10/1999 | Ochiai et al. | |
| 6,352,016 B1 * | 3/2002 | Asbrand et al. ............ | 137/468 |
| 6,397,590 B1 | 6/2002 | Hart | |

* cited by examiner

*Primary Examiner*—Edward K. Look
*Assistant Examiner*—Michael Leslie
(74) *Attorney, Agent, or Firm*—Finnegan, Henderson, Farabow, Garrett & Dunner LLP

(57) ABSTRACT

A method of flowing hydraulic fluid in a work machine is disclosed. The method includes generating a control signal from an input mechanism and generating a property signal indicative of a viscosity of the hydraulic fluid. The control signal and the property signal are received at a control module. The method also includes determining a desired volume flow rate for the control signal and determining a valve control signal required to achieve the desired volume flow rate for the control signal. The valve control signal is based upon the property signal. The valve control signal is output to a proportional valve to provide the desired volume flow rate through the valve for the command signal.

26 Claims, 4 Drawing Sheets

SYSTEM AND METHOD FOR CONTROLLING HYDRAULIC FLUID FLOW

TECHNICAL FIELD

This disclosure is directed to a system and method for controlling flow of a hydraulic fluid in a work machine. More particularly, this disclosure is directed to a system and method for controlling flow of hydraulic fluid to compensate for viscosity changes of the fluid.

BACKGROUND

The properties of hydraulic fluid may be partially dependent on its temperature. For example, when the fluid is cold, it may have a high viscosity, whereas, when the fluid is relatively warmer, the fluid may have a lower viscosity. Work machines, such as skid steer loaders, often use hydraulic fluid to drive actuators and/or hydraulic motors to operate work implements and drive the loader from place to place. For example, a skid steer loader may flow hydraulic fluid through a valve to raise or lower a work implement. When the work machine is started after being idle, the fluid may be cold, and it may take up to an hour for the temperature to rise and stabilize at an operating temperature.

The temperature dependent properties of hydraulic fluid may affect the consistency and responsiveness of the work machine. For a given control signal, a flow-control valve opens a preset percentage, allowing a certain flow rate of fluid volume through the valve. Because the viscosity affects the flow properties of the fluid, for the same given control signal, the volume flow rate of fluid through the valve may be reduced when the fluid is highly viscous than when the fluid is relatively less viscous. Therefore, a command from an operator may cause a work implement to move at one speed when the hydraulic oil is cold and at a second different speed when the hydraulic oil is relatively warmer. Accordingly, the operator must adjust to the differences in responsiveness of the work machine due to the change in viscosity in the hydraulic fluid, which may cause inefficiencies.

U.S. Pat. No. 5,042,323 to Murano et al. discloses a hydraulic control method for a change gear mechanism for a vehicle. This control method includes operating a valve at a frequency to maintain a desired fluid pressure for a clutch system. The frequency of valve operation is incrementally changed as the temperature changes. However, the system disclosed in the '323 patent does not control a proportional flow to control a fluid-operated machine component. Accordingly, the system disclosed in the '323 patent may not provide consistency to a work machine dependent on flow control.

The method and system disclosed herein may provide a more consistent control of a work machine in a variable temperature environment.

SUMMARY OF THE INVENTION

In one aspect, this disclosure is directed to a method of flowing hydraulic fluid in a work machine. The method includes generating a control signal from an input mechanism and generating a property signal indicative of a viscosity of the hydraulic fluid. The control signal and the property signal are received at a control module. The method also includes determining a desired volume flow rate for the control signal and determining a valve control signal required to achieve the desired volume flow rate for the control signal. The valve control signal is based upon the property signal. The valve control signal is output to a proportional valve to provide the desired volume flow rate through the valve for the command signal.

In another aspect, this disclosure is directed to a system for flowing hydraulic fluid in a work machine. The system includes an input mechanism configured to generate a control signal and a property sensor configured to generate a property signal indicative of a viscosity of the hydraulic fluid. The system also includes a proportional valve. A control module is configured to receive the control signal and the property signal. The control module stores a desired volume flow rate for the control signal and is configured to determine a valve control signal required to achieve the desired volume flow rate for the control signal, based upon the property signal. The control module is configured to output the valve control signal to the valve to provide the desired volume flow rate through the valve for the given command signal.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
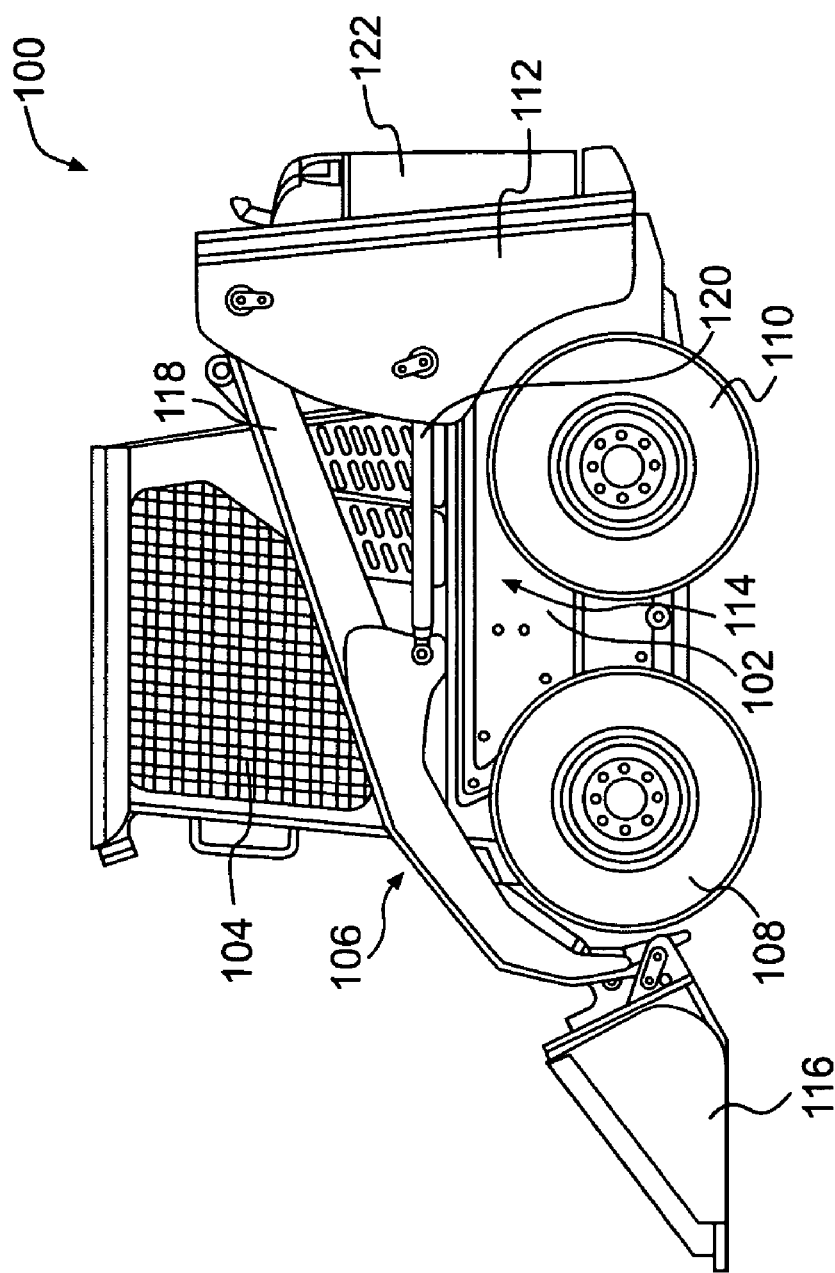
FIG. 1 is a pictorial representation of an exemplary skid steer loader.

FIG. 1 shows one exemplary aspect of a work machine 100, shown as a skid steer loader. The work machine 100 includes a body 102, an operator's station 104, an implement assembly 106, and front and rear drive wheels 108, 110, respectively.

The body 102 may be a frame structure that is connected with and supports the weight of the operator's station 104 and the implement assembly 106. It may include an upright stanchion 112 that connects to the implement assembly 106 and that may be disposed behind the operator's station 104. The operator's station 104 may be an open or an enclosed station that may include a chair and controls for operating various features of the work machine 100.

The implement assembly 106 may include a lift arm assembly 114 and a work implement 116. The lift arm assembly 114 may include a lift arm 118 and one or more actuators 120. The lift arm 118 and the actuators 120 may connect to the stanchion 112 and may be configured to raise, lower, and otherwise move the work implement 116. The actuators 120 may be fluid driven and may be operated by pressurized fluid passed through a valve (not shown). Although only one actuator is shown, it is understood that the actuator 120 may be representative of any hydraulic actuator on the work machine 100, regardless of its location or purpose. The work implement 116 is shown as a bucket, pivotally mounted at the forward end of the lift arm 118. However, it is anticipated that other work implements could be used.

The front and rear drive wheels 108, 110 are mounted to the body 102 and powered by a hydraulic motor (not shown in FIG. 1), which may be also mounted to the body 102 rearward of the operator's station 104 in a rear motor housing 122. The drive wheels 108, 110 may be driven in a conventional, skid-steer fashion and, in one exemplary embodiment, may be replaced by left and right endless belts or track assemblies (not shown).

Figure 2:
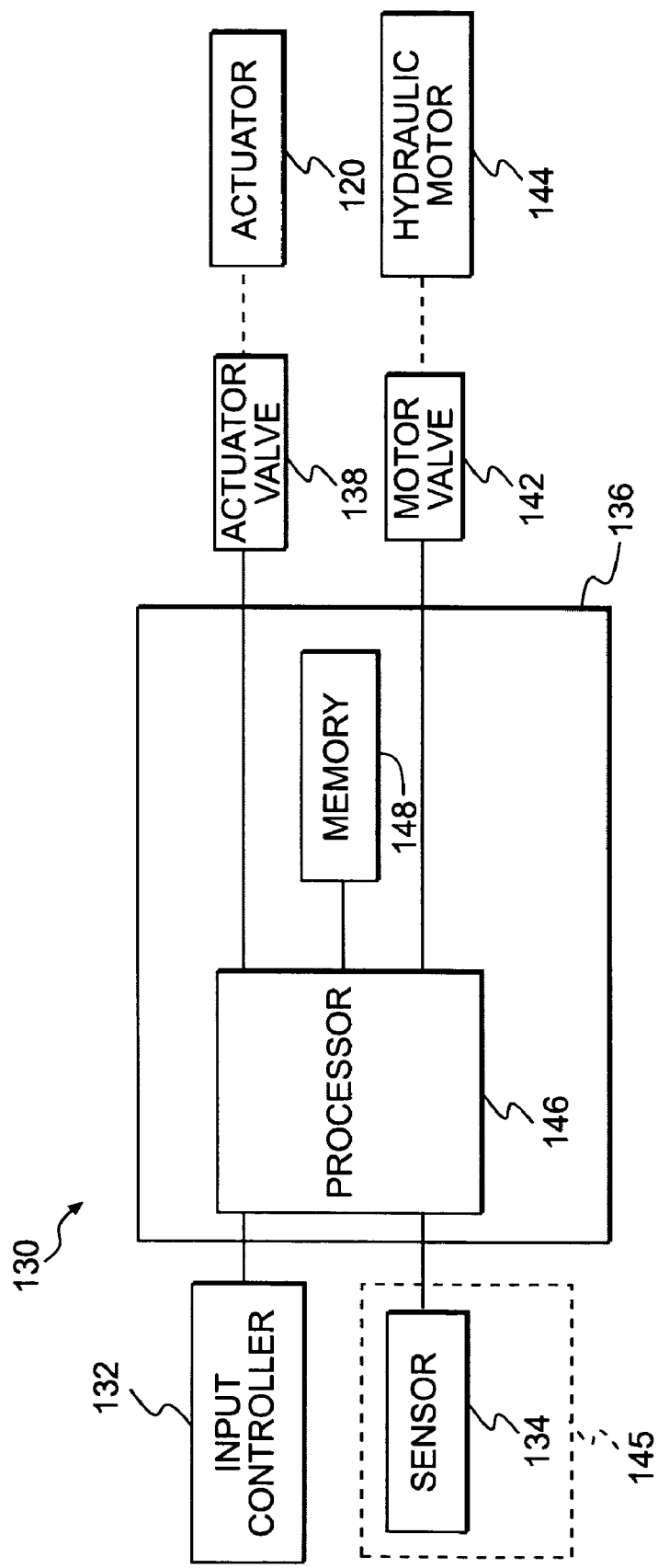
FIG. 2 is a block diagram showing an exemplary control system for a work machine.

FIG. 2 shows an exemplary control system 130 on the work machine 100. As shown in FIG. 2, the control system 130 includes an input controller 132, a property sensor 134, and a control module 136. It also includes an actuator valve 138 and a motor valve 142 that may be used to drive, for example, fluid driven components, such as the actuators 120 of the work machine 100 and a hydraulic motor 144. The input controller 132 may be located in the operator's station 104 of the work machine 100 and may be configured to be controlled by the operator to generate a control signal to operate the implement assembly 106 and/or drive the work machine 100. The input controller 132 may be a lever, a joystick, a steering wheel, keyboard, button, or other input device.

The property sensor 134 may be a sensor configured to monitor a property of the hydraulic fluid used to operate the work machine 100. In one exemplary embodiment, the property sensor 134 is a temperature sensor configured to read or sense a temperature of the hydraulic fluid. In another exemplary embodiment, the property sensor 134 is a flow sensor configured to monitor the flow of the hydraulic fluid through a line or valve on the work machine 100. Measuring the temperature and/or the flow of the hydraulic fluid may enable the control system 130 to determine the viscosity of the fluid. In the exemplary embodiment shown, the property sensor 134 is a temperature sensor disposed within a hydraulic reservoir 145 on the work machine 100. Fluid may be drawn from the reservoir 145 to operate the implement assembly 106 and/or the hydraulic motor 144 to drive the work machine 100. It should be noted that the property sensor 134 could be placed at other locations on the work machine 100.

The control module 136 may include a processor 146 and memory device 148, as is known in the art. The processor 146 may be a microprocessor or other processor, and may be configured to execute computer readable code or computer programming to perform functions, as is known in the art. The memory device 148 may be in communication with the processor 146, and may provide storage of computer programs and executable code, including algorithms and data corresponding to known specifications of the work machine 100.

The control module 136 is in electrical communication with the input controller 132 and the property sensor 134 and is configured to receive the control signal from the input controller 132 and a property signal from the property sensor 134. In addition, the control module 136 may be in electrical communication with the actuator valve 138 and/or the motor valve 142.

Figure 3:
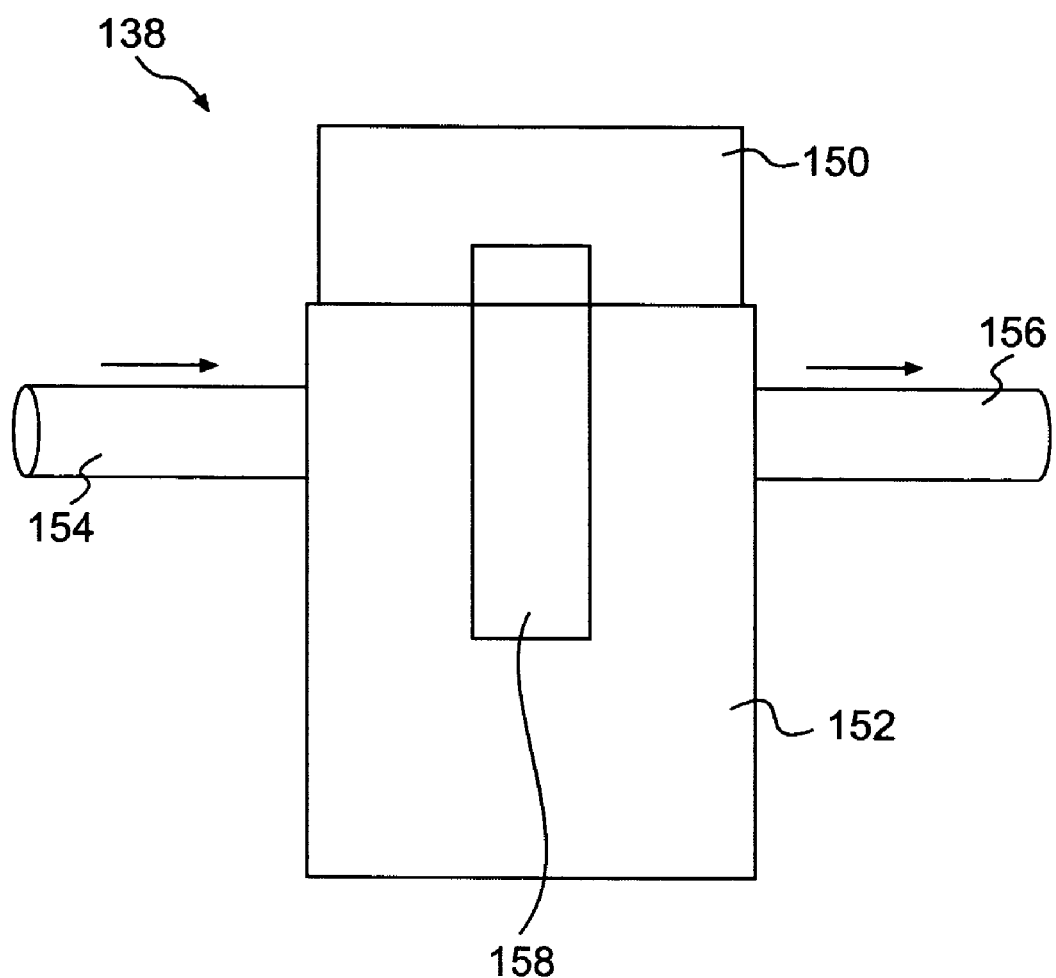
FIG. 3 is a diagrammatic illustration of an exemplary actuator valve.

The actuator valve 138 may be a proportional valve configured to open and close a valve orifice, thereby regulating the flow of hydraulic fluid to the actuators 120. One exemplary embodiment of the actuator valve 138 is shown in diagrammatic form in FIG. 3. Referring to FIG. 3, the actuator valve 138 may include a solenoid 150 and a body 152. An inlet line 154 and an outlet line 156 may be in fluid communication with the body 152.

The solenoid 150 may be in electrical communication with the control module 136 and may be configured to receive electrical signals as electrical current. The body 152 may house a spool 158 moveable by the solenoid 150 to adjust the size of an orifice (not shown). The orifice size may be adjusted to regulate the flow of fluid through the body 152, from the inlet line 154 to the outlet line 156 in a manner known in the art. As known in the art, the greater the distance that the spool 158 travels, the greater the size of the orifice. The inlet line 154 may be in communication with the fluid reservoir 145 while the outlet line 156 may be in fluid communication with the actuator 120.

The motor valve 142 may also be a proportional valve, such as the valve described with reference to FIG. 3, or may be a pump that may include a proportional valve configured to open and close an orifice, as explained above. Returning to FIG. 2, fluid from the motor valve 142 may flow to and drive the hydraulic motor 144. The hydraulic motor 144 may provide power to the front and rear wheels 108, 110 to maneuver and drive the work machine 100. It should be noted that although only one actuator valve and one motor valve are shown, there could be any number of valves in communication with the control module that control any number of hydraulically driven components.

As stated above, the viscosity of the hydraulic fluid is dependent on the fluid temperature. Accordingly, when the work machine 100 is started after sitting idle for some time, the hydraulic fluid may be relatively cool, and therefore, may have a high viscosity. However, as the work machine 100 is operated, the fluid temperature may rise, and the viscosity may decrease.

The control module 136 is configured to control the valves 138, 142 so that, from an operator's perception, the work machine 100 responds substantially the same to an input at the input controller 132, regardless of the temperature of the hydraulic fluid. This may be accomplished by controlling the proportional actuator valve 138 or the motor valve 142 to provide a consistent fluid volume flow rate to the fluid driven components for a given control signal, regardless of the temperature of the fluid.

The control module 136 accomplishes this by generating and sending a valve control signal to the actuator valve 138 and/or the motor valve 142, based on the control signal from the input controller 132 and the property signal from the property sensor 134. The valve control signal actuates the solenoid 150 in the actuator valve 138 and/or the motor valve 142 to open the respective valve orifice a determined amount.

For understanding, it should be noted that when a volume of highly viscous fluid passes through the valve at the same flow rate as a volume of less viscous fluid, the responsiveness of the work machine 100 will be consistent. To do this, the size of the orifice may be enlarged to allow a given volume of highly viscous fluid to pass through a valve at the same flow rate as the same volume of relatively less viscous fluid. The control module 136 is configured to generate a valve control signal that provides a larger orifice when the fluid temperature is low and the fluid is highly viscous. Stated another way, a consistent volume flow rate through the valve is provided for a given control signal from an input mechanism regardless of the viscosity of the hydraulic fluid.

Figure 4:
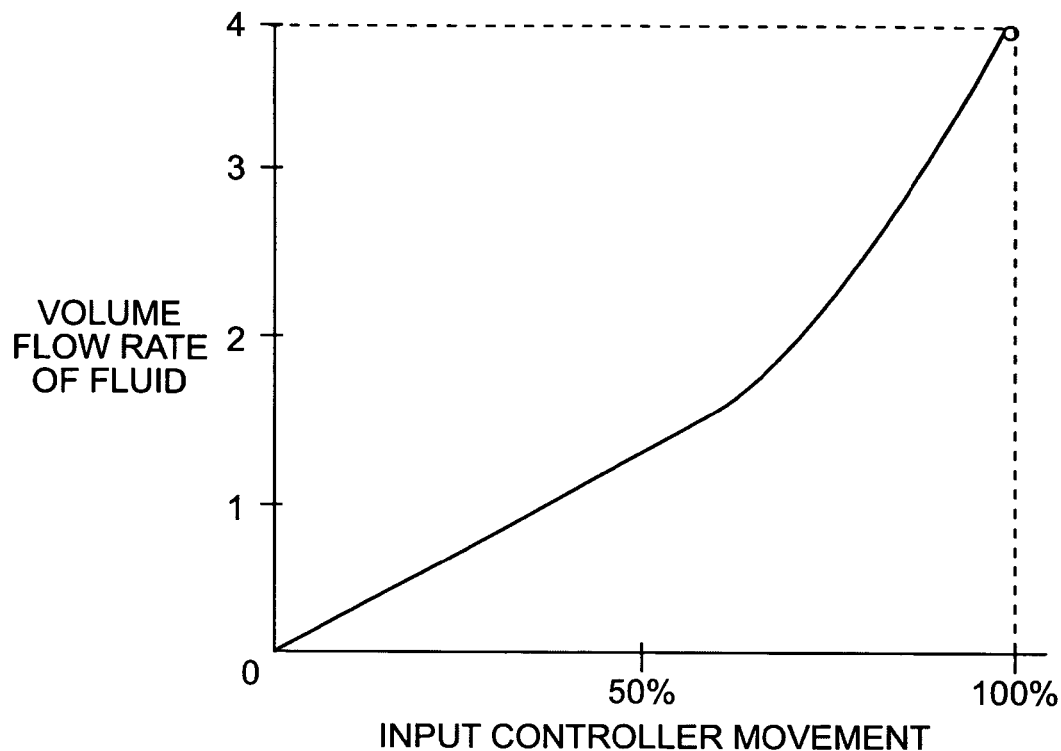
FIG. 4 is a graph showing an exemplary relationship between input controller movement and a fluid flow rate.

FIG. 4 shows an exemplary target relationship between movement of the input controller 132 by an operator and a volume flow rate of fluid that flows through the actuator valve 138 and/or the motor valve 142. The target relationship in FIG. 4 may be stored in the memory 148 and may be referenced by the processor 146 when the control module 136 determines and generates the valve control signal.

In FIG. 4, the horizontal axis represents a percentage of a total input controller movement, such as the distance a joystick is moved forward. The vertical axis represents a target volume flow rate of fluid, in units, that flows through the actuator valve 138 and/or the motor valve 142. The units could be any units measurable for a volume flow rate of liquid. Accordingly, the graph shows the target volume flow rate of fluid that should flow through the valves 138, 142 for the percentage of movement of the input controller 132. It should be noted that the target relationship may be established based on the properties of the hydraulic fluid at a benchmark fluid temperature, such as a standard operating temperature. This benchmark temperature may be preselected based on the type of fluid used, the type of work machine used, the work machine application, the temperature environment where the work machine is used, among other factors. Alternatively, the benchmark temperature may be randomly selected and used only as a reference point for comparison to other temperatures.

The target relationship between the percentage of movement of the input controller 132 and the volume flow rate of fluid that flows through the valves 138, 142 is a target relationship regardless of the temperature and viscosity of the hydraulic fluid. In the target relationship shown, movement of the input controller 132 to about 50% signals the control module 136 to open the actuator valve 138 and/or motor valve 142 to provide a fluid flow having a volume flow rate of about 1.2 volume units per time unit. Thus, because the relationship is a target relationship, the control module 136 is configured to control the valves to open the valve orifices to allow about 1.2 volume units per time unit of flow for a 50% controller input, irrespective of the fluid viscosity.

Figure 5:
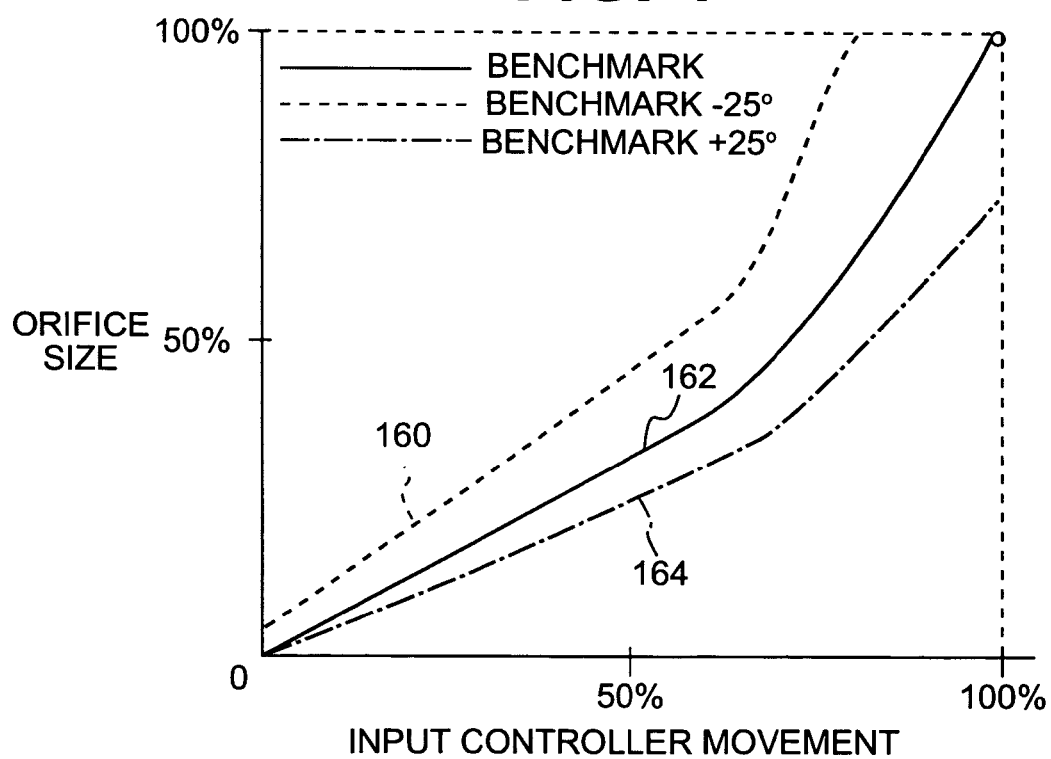
FIG. 5 is a graph showing an exemplary relationship between input controller movement and a valve orifice size.

In one exemplary embodiment, the control module 136 is configured to determine the orifice size required to match the target volume flow rate relationship using a lookup table or other graphical means. FIG. 5 is a graph showing an exemplary relationship between a percentage of movement of the input controller 132 and the orifice size of the actuator valve 138 and/or the motor valve 142. As stated above, the orifice size may be based upon travel of the spool 158 as controlled by the solenoid 150.

In FIG. 5, the horizontal axis represents a percentage of a total input controller movement, such as the distance a joystick is moved forward. The vertical axis represents the orifice size in the actuator valve 138 and/or the motor valve 142 as a percentage of the total available orifice size. The different curves (160, 162, and 164) correspond to the hydraulic fluid at different temperatures, and show the orifice size that enables the fluid to flow at the target volume flow rate for controller movement shown in FIG. 4. For example, the curve 160 shows the relationship between controller movement and orifice size to achieve the target volume flow rate of FIG. 4 when the temperature of the fluid is twenty-five degrees less than the benchmark temperature. Curve 162 shows the relationship between controller movement and orifice size to achieve the target volume flow rate of FIG. 4 when the temperature of the fluid is at the benchmark temperature. Curve 164 shows the relationship between controller movement and orifice size to achieve the target volume flow rate of FIG. 4 when the temperature of the fluid is 25 degrees higher than the benchmark temperature.

In the graph of FIG. 5, only selected temperature curves are shown. However, the control module 136 may store a different curve for each temperature, and may reference the appropriate curve when the control module 136 generates the valve control signal based on the control signal from the input controller 132.

In another exemplary embodiment, the control module 136 is configured to determine the orifice size based on an adjustment factor or algorithm. The algorithm may calculate the size of orifice necessary to allow the flow of fluid at the relationship shown in FIG. 4 for any given temperature. The control module 136 may then control the valves 138, 142 to open the orifice the designated amount.

INDUSTRIAL APPLICABILITY

One exemplary method for controlling the work machine to provide consistent responsiveness to any given input, irrespective of the fluid temperature, will now be described. During operation of the work machine 100, the property sensor 134 senses a property of the hydraulic fluid. In one exemplary embodiment, the sensed property is a temperature, while in another embodiment, the sensed property is the fluid flow. These may be indicative of a viscosity of the fluid. The property sensor 134 electronically communicates a property signal representative of the property to the control module 136.

A work machine operator may move the input controller 132 to generate a control signal that operates fluid driven components, such as the implement assembly 106 and the hydraulic motor 144. The input controller 134 communicates the control signal to the control module 136. Within the control module 136, a stored benchmark provides a target volume flow rate of fluid for any given command signal. Because the viscosity, and hence the flowability, of the hydraulic fluid varies with temperature, the benchmark or target volume flow rate of fluid is achieved by modifying the orifice size of the valves 138, 142 to compensate for instances when the fluid temperature is not equal to the benchmark temperature.

To do this, the control module 136 compares the control signal to the benchmark or target volume flow rate stored within the control module 136 for the given control signal. Based on the property signal from the property sensor 134, the control module 136 determines the orifice size required to maintain the target benchmark relationship for the given command signal. The control module 136 then generates a valve control signal that is indicative of the desired orifice size in order to flow the target fluid volume flow rate for the given command signal.

The valve control signal is sent from the control module 136 to the appropriate valve, such as actuator valve 138 to move the actuator 120 or the motor valve 142 to drive the hydraulic motor 144. The valve receives the valve control signal and responds by opening the valve orifice a designated amount to provide a volume flow rate consistent with the benchmark or target volume flow rate for the command signal. This may be done by energizing the solenoid 150 in the valve 138, 142 to move the spool 158 a designated distance to open the orifice a designated amount. As the spool 158 opens the orifice, fluid flows to the actuator 120 or the motor 144.

The control module 136 may generate the valve control signal using, inter alia, a stored lookup table and/or adjustment factor. The lookup table and/or adjustment factor may be configured to determine the orifice size required to maintain the target volume flow rate for the given command signal. Accordingly, relying upon the lookup table or adjustment factor, the control module 136 may determine the fluid volume flow rate required to provide a consistent flow regardless of the temperature of the fluid.

Because the relationship between fluid flow and input controller movement can be adjusted to substantially match the target relationship, regardless of the viscosity of the hydraulic oil, the responsiveness and controllability of the work machine 100 can be made to feel substantially consistent to an operator, irrespective of the fluid temperature. Therefore, the operator may have consistent control and may be able to provide a consistent response and a more predictable machine, whether at start-up, when the fluid is cool, or after hours of work, when the fluid is relatively warmer. The temperature feedback control system may be used on any work machine requiring hydraulic fluid.

It will be apparent to those skilled in the art that various modifications and variations can be made in the disclosed embodiments without departing from the scope of the disclosure. Other embodiments will be apparent to those skilled in the art from consideration of the specification and practice of the methods and systems disclosed herein. It is intended that the specification and examples be considered as exemplary only, with a true scope of the disclosure being indicated by the following claims and their equivalents.

What is claimed is:

1. A method of flowing hydraulic fluid in a work machine, comprising:
   generating a control signal from an input mechanism;
   generating a property signal indicative of a viscosity of the hydraulic fluid;
   receiving the control signal and the property signal at a control module;
   determining a desired volume flow rate for the control signal;
   determining a valve control signal required to achieve the desired volume flow rate for the control signal, the valve control signal being based upon the property signal; and
   outputting the valve control signal to a proportional valve to provide a consistent volume flow rate through the valve for a given control signal from an input mechanism regardless of the viscosity of the hydraulic fluid.

2. The method of claim 1, wherein determining a valve control signal includes determining the valve control signal based on a look-up table.

3. The method of claim 2, wherein the lookup table influences the valve control signal to control the valve so that a valve orifice size is larger for the control signal as the viscosity of the hydraulic fluid increases.

4. The method of claim 1, wherein determining a valve control signal includes determining the valve control signal based on an adjustment factor.

5. The method of claim 1, including actuating a spool in the valve with a solenoid to open a valve orifice.

6. The method of claim 5, including driving at least one of an actuator and a hydraulic motor with the hydraulic fluid from the valve orifice.

7. The method of claim 1, wherein determining a desired volume flow rate for the control signal includes storing a benchmark relationship between input mechanism movement and fluid volume flow rate.

8. The method of claim 1, wherein generating a property signal includes measuring a temperature of the hydraulic fluid.

9. A system for flowing hydraulic fluid in a work machine, comprising:
   an input mechanism configured to generate a control signal;
   a property sensor configured to generate a property signal indicative of a viscosity of the hydraulic fluid;
   a proportional valve; and
   a control module configured to receive the control signal and the property signal, the control module having a desired volume flow rate for the control signal stored therein, and being configured to determine a valve control signal required to achieve the desired volume flow rate for the control signal, based upon the property signal, and the control module being configured to output the valve control signal to the valve to provide a consistent volume flow rate through the valve for a given control signal from an input mechanism regardless of the viscosity of the hydraulic fluid.

10. The system of claim 9, wherein the control module is configured to determine the valve control signal based on a look-up table.

11. The system of claim 10, wherein the lookup table is configured to influence the valve control signal in a manner that controls the valve so that a valve orifice size is larger as the viscosity of the hydraulic fluid increases.

12. The system of claim 9, wherein the control module is configured to determine the valve control signal based on an adjustment factor.

13. The system of claim 9, including an actuator in communication with the proportional valve, the valve being configured to control movement of the actuator.

14. The system of claim 9, including a hydraulic motor in communication with the proportional valve, the valve being configured to control flow of fluid to the hydraulic motor.

15. The system of claim 14, wherein the proportional valve is included with a pump.

16. The system of claim 14, including a spool in the valve and a solenoid configured to displace the spool to open a valve orifice.

17. The system of claim 9, wherein the property sensor is a temperature sensor configured to measure the temperature of the hydraulic fluid.

18. The system of claim 9, wherein the control module is configured to store a benchmark relationship between input mechanism movement and volume flow rate of fluid.

19. A method of flowing hydraulic fluid in a work machine, comprising:
   generating a control signal from an input mechanism;
   measuring a temperature of the hydraulic fluid;
   generating a temperature signal representative of the measured temperature, the temperature signal being indicative of a viscosity of the hydraulic fluid;
   receiving the control signal and the temperature signal at a control module;
   storing a desired volume flow rate for the control signal as a benchmark relationship between input mechanism movement and volume flow rate of fluid;
   determining a valve control signal required to achieve the desired volume flow rate for the control signal, the valve control signal being based upon the temperature signal;
   outputting the valve control signal to a proportional valve to open a valve orifice to provide the desired volume flow rate for the command signal; and
   actuating a hydraulic actuator with the fluid.

20. The method of claim 19, wherein determining a valve control signal includes determining the valve control signal based on a look-up table.

21. The method of claim 20, wherein the lookup table influences the valve control signal to control the valve so that a valve orifice size is larger for the control signal as the viscosity of the hydraulic fluid increases.

22. The method of claim 19, wherein determining a valve control signal includes determining the valve control signal based on an adjustment factor.

23. A method of flowing hydraulic fluid in a work machine, comprising:
- generating a control signal from an input mechanism;
- generating a property signal indicative of a viscosity of the hydraulic fluid;
- receiving the control signal and the property signal at a control module;
- determining a desired volume flow rate for the control signal;
- determining a valve control signal required to achieve the desired volume flow rate for the control signal, the valve control signal being based upon the property signal;
- outputting the valve control signal to a proportional valve to provide the desired volume flow rate through the valve for the command signal;
- wherein determining a valve control signal includes determining the valve control signal based on a look-up table; and
- wherein the lookup table influences the valve control signal to control the valve so that a valve orifice size is larger for the control signal as the viscosity of the hydraulic fluid increases.

24. A method of flowing hydraulic fluid in a work machine, comprising:
- generating a control signal from an input mechanism;
- generating a property signal indicative of a viscosity of the hydraulic fluid;
- receiving the control signal and the property signal at a control module;
- determining a desired volume flow rate for the control signal;
- determining a valve control signal required to achieve the desired volume flow rate for the control signal, the valve control signal being based upon the property signal;
- outputting the valve control signal to a proportional valve to provide the desired volume flow rate through the valve for the command signal; and
- wherein determining a desired volume flow rate for the control signal includes storing a benchmark relationship between input mechanism movement and fluid volume flow rate.

25. A system for flowing hydraulic fluid in a work machine, comprising:
- an input mechanism configured to generate a control signal;
- a property sensor configured to generate a property signal indicative of a viscosity of the hydraulic fluid;
- a proportional valve; and
- a control module configured to receive the control signal and the property signal, the control module having a desired volume flow rate for the control signal stored therein, and being configured to determine a valve control signal required to achieve the desired volume flow rate for the control signal, based upon the property signal, and the control module being configured to output the valve control signal to the valve to provide the desired volume flow rate through the valve for the given command signal;
- wherein the control module is configured to determine the valve control signal based on a look-up table; and
- wherein the lookup table is configured to influence the valve control signal in a manner that controls the valve so that a valve orifice size is larger as the viscosity of the hydraulic fluid increases.

26. A system for flowing hydraulic fluid in a work machine, comprising:
- an input mechanism configured to generate a control signal;
- a property sensor configured to generate a property signal indicative of a viscosity of the hydraulic fluid;
- a proportional valve;
- a control module configured to receive the control signal and the property signal, the control module having a desired volume flow rate for the control signal stored therein, and being configured to determine a valve control signal required to achieve the desired volume flow rate for the control signal, based upon the property signal, and the control module being configured to output the valve control signal to the valve to provide the desired volume flow rate through the valve for the given command signal; and
- wherein the control module is configured to store a benchmark relationship between input mechanism movement and volume flow rate of fluid.

* * * * *